United States Patent [19]

Bengel et al.

[11] Patent Number: 5,126,100
[45] Date of Patent: Jun. 30, 1992

[54] SYSTEM FOR QUALIFICATION OF CHEMICAL DECONTAMINATION METHODS FOR DECONTAMINATION OF NUCLEAR REACTOR SYSTEMS

[75] Inventors: Thomas G. Bengel, Plum Boro; Gary J. Corpora, Monroeville; Robert M. Roidt, N. Versailles; James S. Schlonski, Monroeville, all of Pa.

[73] Assignee: Westinghouse Electric Corp., Pittsburgh, Pa.

[21] Appl. No.: 633,888

[22] Filed: Dec. 26, 1990

[51] Int. Cl.⁵ .................................... G21C 17/00
[52] U.S. Cl. ............................. 376/305; 376/245
[58] Field of Search ............... 376/245, 247, 305, 310, 376/340, 341

[56] References Cited

U.S. PATENT DOCUMENTS

| | | | |
|---|---|---|---|
| 4,727,826 | 3/1988 | Draper et al. | 376/245 |
| 4,937,038 | 6/1990 | Sakai et al. | 376/245 |
| 5,024,805 | 6/1991 | Murray | 376/305 |

Primary Examiner—Brooks H. Hunt
Assistant Examiner—Frederick H. Voss

[57] ABSTRACT

A unique and optimal method for assessing the feasibility of employing chemical decontamination processes to remove crud from nuclear reactor primary systems without adversely affecting the integrity of the system components or piping during further reactor operation is disclosed. Materials used to construct such components and piping are exposed to several cycles of simulated decontamination processing with a test loop constructed to simulate a range of full system decontamination process conditions. The material specimens are then removed and tested to assure that the particular decontamination processing system has no adverse effects on the materials used.

6 Claims, 2 Drawing Sheets

SYSTEM FOR QUALIFICATION OF CHEMICAL DECONTAMINATION METHODS FOR DECONTAMINATION OF NUCLEAR REACTOR SYSTEMS

BACKGROUND OF THE INVENTION

1. Field of the Invention

The present invention relates to the field of decontamination of nuclear reactor primary systems. More specifically, it relates to a unique method of qualifying a chemical decontamination process for chemical decontamination of within nuclear reactor primary systems.

2. Description of the Prior Art

The problem of excessive personnel exposures caused by high background radiation levels in a nuclear reactor primary system, such as in pressurized water reactor (PWR) systems, and the resultant economic cost of requiring personnel rotation to minimize individual exposure is significant at many nuclear plants. These background levels are principally due to the buildup of corrosion products in certain areas of the plant. The buildup of corrosion products exposes workers to high radiation levels during routine maintenance and refueling outages. The long term prognosis is that personnel exposure levels will continue to increase.

As a nuclear power plant operates, the surfaces in the core and primary system corrode. Corrosion products, referred to as crud, are activated by transport of the corroded material to the core region by the reactor coolant system (RCS). Subsequent release of the activated crud and redeposition elsewhere in the system produces radiation fields in piping and components throughout the primary system, thus increasing radiation levels throughout the plant. The activity of the corrosion product deposits is predominately due to Cobalt 58 and Cobalt 60. It is estimated that 80-90% of personnel radiation exposure can be attributed to these elements.

One way of controlling worker exposure, and of dealing with this problematic situation, is to periodically decontaminate the nuclear steam supply system using chemicals, thereby removing a significant fraction of the corrosion product oxide films. A major concern, however, is the potential for removing base material from the fuel, equipment, piping, and instrumentation of the RCS and causing significant degradation that may adversely impact the function, design capability, or life of the RCS. As a result, prior techniques had done very little to decontaminate the primary system as a whole, typically focusing only on the heat exchanger (steam generator) channel heads.

Two different chemical processes, referred to as LOMI (developed in England under a joint program by EPRI and the Central Electricity Generating Board) and CAN-DEREM (developed by Atomic Energy of Canada, Ltd.), have been used for small scale decontamination in the past. These processes are multi-step operations, in which various chemicals are injected, recirculated, and then removed by ion-exchange. Although the chemicals are designed to dissolve the corrosion products, some particulates are also generated. One method of chemical decontamination, focusing on the chemistry of decontamination, is disclosed in U.K. Patent Application No. GB 2 085 215 A (Bradbury et al.). There is little disclosure, however, of the methodology to be used in applying that chemistry to system decontamination.

While these chemical processes had typically been used on only a localized basis, use of these chemical processes is now being considered for possible application on a large scale, full system chemical decontamination. Certain methods of integrating such chemical decontamination systems into nuclear reactor primary systems are described in co-pending Application Ser. No. 07/621,120 entitled "System For Chemical Decontamination Of Nuclear Reactor Primary Systems," and co-pending Application Serial No. 07/621,129, entitled "Clean-up Sub-system For Chemical Decontamination Of Nuclear Reactor Primary Systems," both of which are incorporated herein by reference.

The need for evaluating the feasibility of performing the chemical decontamination within the reactor as a whole was not realized until full system decontamination was considered. Before a full system decontamination process can be used in a nuclear power plant facility, it must be determined that the decontamination process chemicals and/or clean-up sub-system have no harmful effect on the components and piping used in the nuclear power plant that such chemicals and clean-up sub-system will come into contact with.

While some work has been done in the boiling water reactor (BWR) programs to assess feasibility of reactor decontamination, the BWR scenarios examined by those in the field involved decontaminating fuel assemblies in sipping cans employing commercial processes at off-normal decontamination process conditions with little regard for the effects of temperature, pressure, and flow that would be mandated by an actual application of the process to the full reactor system. Subsequent to the decontamination, the fuel assemblies were shipped to a hot cell facility for non-destructive and destructive examinations.

As a result of the examination of potential full-system decontamination, a need now exists for an economic and accurate technique to assess the feasibility of employing chemical decontamination processes to remove crud from primary systems without adversely affecting the integrity of the components and piping during further reactor operation.

SUMMARY OF THE INVENTION

The present invention is directed to a method and an apparatus for assessing the feasibility of employing particular chemical decontamination processes to remove crud from primary systems in nuclear reactors. To this end, samples of the materials that are used in the construction of the primary reactor coolant system (RCS) are subjected to several cycles of a simulated commercial decontamination process conditions in a decontamination test loop (DTL) apparatus capable of duplicating the full range of reactor decontamination conditions.

A simulator apparatus allows coupons of material to be subjected to the temperatures, pressures, and flow velocities that would be experienced by materials used in an RCS. Iron is added to the system to further simulate over a shorter time span the build-up of crud in a typical RCS. The exposed materials can then be evaluated to assess the impact and acceptability of the decontamination processes and/or the materials used. As a result, particular decontamination processes can be qualified for use with particular materials and in particular nuclear power plants.

Accordingly, it is an object of the present invention to provide a method and apparatus for assessing the feasibility of employing particular chemical decontamination processes to remove crud from nuclear reactor primary systems without adversely affecting the integrity of the system components and piping during further reactor operation. These and further objects and advantages will be apparent to those skilled in the art in connection with the detailed description of the invention that follows.

DETAILED DESCRIPTION OF THE PREFERRED EMBODIMENTS

Figure 1:
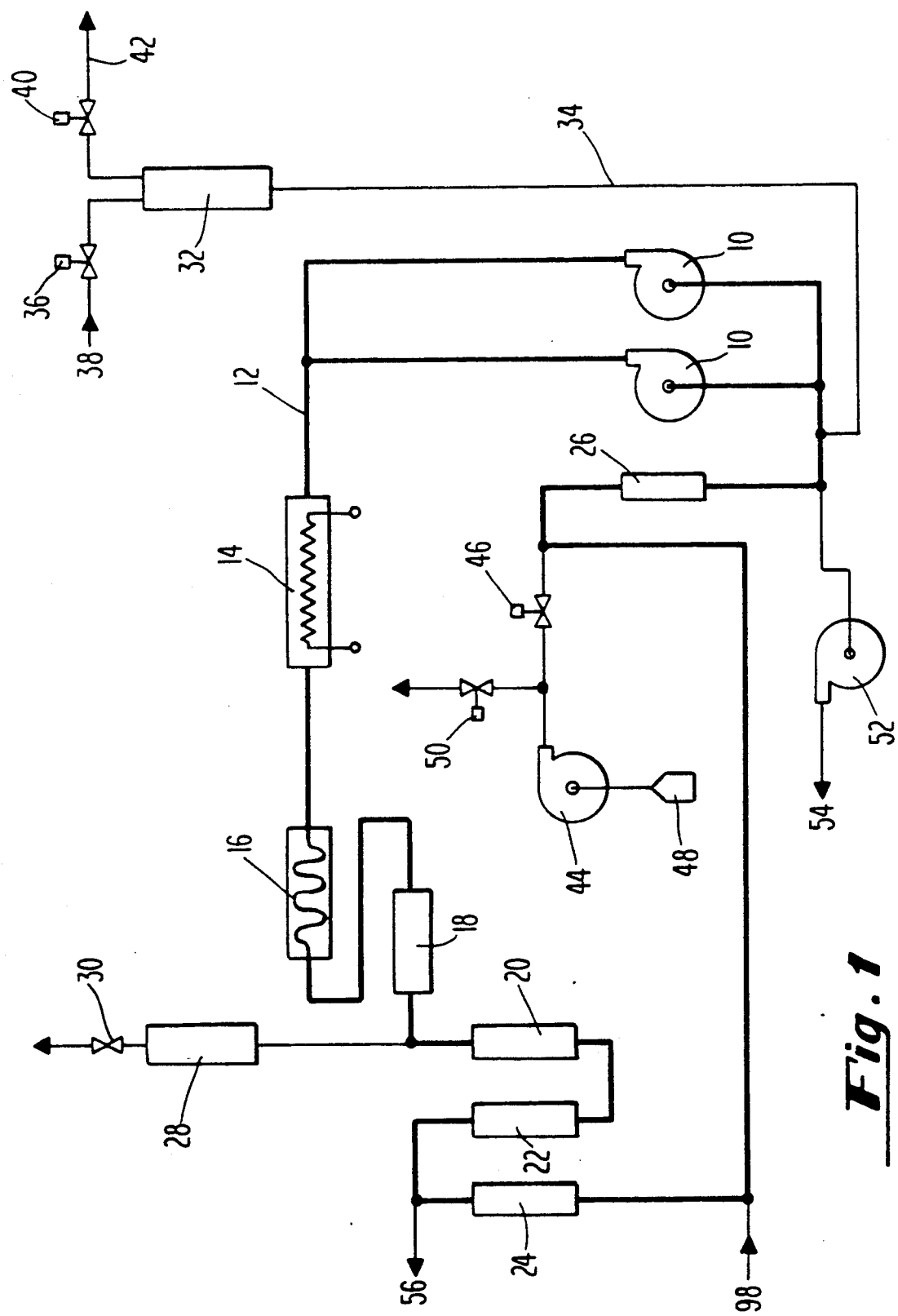
FIG. 1 is a schematic flow diagram illustrating the primary loop of one embodiment of the DTL apparatus of the present invention.

In order to utilize the two current decontamination process technologies (CAN-DEREM and LOMI), as well as any other future chemical processes that are developed, the operating capability of the RCS of a nuclear reactor, and of any auxiliary systems to that nuclear reactor, must be adaptable to the requirements of these chemical processes in terms of flow, temperature, pressure, and mass inventory. Ideally, this should be accomplished with as few hardware and operational changes as possible.

In response to this industry need, the method and apparatus of the present invention was developed in order to test and qualify the materials used in pressurized water reactor systems for chemical decontamination such that full RCS chemical decontamination can be performed. The general concept of the present invention is to conduct decontamination chemical exposure testing in a decontamination test loop. In order to achieve this concept, a unique decontamination facility was required, designed to simulate the conditions that would be experienced during a full RCS decontamination program.

Another significant question in considering full RCS decontamination is whether or not the process should be conducted with the fuel in or out of the reactor. It would be preferable to decontaminate with the fuel in place. To this end, a qualification system for determining the feasibility of conducting full system decontamination with fuel assemblies in place is disclosed in co-pending application Ser. No. 07/621,131, entitled "System For Qualification Of Chemical Decontamination Methods For Decontamination Of Nuclear Reactor Fuels," and is complimentary to the method and apparatus of the present invention.

The present invention ascertains the impact that the decontamination process chemicals and primary system conditions of pressure, temperature, and flow rate have upon the particular materials available for use in the construction of primary system components and piping. Potential materials are subjected to commercial decontamination process conditions in a constructed decontamination test loop or DTL. The DTL duplicates the conditions of temperature, pressure, and velocity, and is operated according to the commercial procedures that duplicate the reactor system water chemistry, the decontamination chemicals, the chemical concentrations, the duration of exposure to the chemicals, and the sequence of chemical application. The materials subjected to the processes are subsequently tested and evaluated to determine any general corrosion, localized corrosion, or stress corrosion cracking propensity. The results can then be evaluated to assess the impact and acceptability of the decontamination processes and/or the materials used.

In one embodiment, materials subjected to chemical decontamination in a DTL qualification facility will be run in parallel with materials that are not subjected to the chemical processes but are subjected to other process conditions so that an accurate comparison, and identification of the effects of the chemical decontamination process, can be accomplished.

The combined results of the above steps are assessed, along with other considerations, to determine the suitability of the chemical decontamination process for full system decontamination, and to establish any particular boundary conditions or constraints required to undertake full core decontamination.

In order to proceed with the inventive approach defined above, it was necessary to develop a technique for simulating the chemical decontamination of a full primary system. The system design should also preferably duplicate the full RCS conditions of pressure, temperature, and fluid velocity, thereby providing a realistic representation of process conditions for an accurate qualification assessment.

Figure 2:
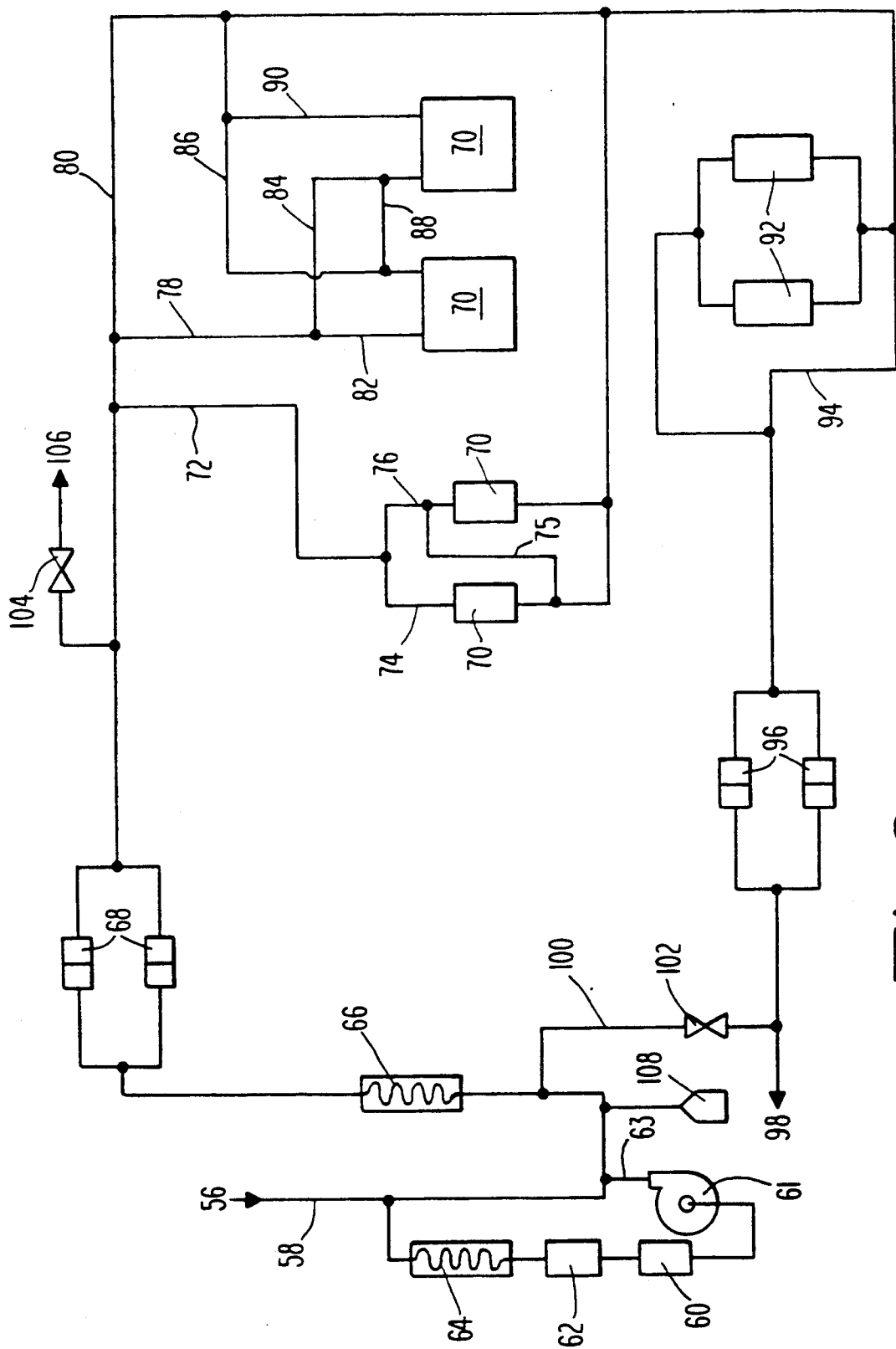
FIG. 2 is a schematic flow diagram illustrating the secondary loop of one embodiment of the DTL apparatus of the present invention such as might be used in conjunction with the embodiment of FIG. 1.

Turning in detail to the drawings, where like numbers refer to like items, FIGS. 1 and 2 in combination represent a schematic flow diagram of a preferred embodiment of the DTL qualification facility of the present invention. Other configurations are possible and do not affect the method and apparatus of the present invention.

The design of the decontamination test loop qualification facility is comprised preferably of a primary decontamination test loop, shown in FIG. 1, and a parallel secondary ion exchange loop shown in FIG. 2. Looking particularly at FIG. 1, the primary loop includes two recirculation pumps 10 for circulating process fluids and chemicals. In normal operation, only one such recirculation pump 10 is necessary, but redundancy is preferable as a precaution. Process fluids are pumped by the recirculation pumps 10 in primary flow line 12 through both a heater 14 and a heat exchanger 16. The heater 14 and heat exchanger 16, can be utilized as appropriate to add or subtract heat from the decontamination test loop in order to maintain appropriate temperatures and simulate process conditions and their order as arranged on primary flow line 12 can be reversed.

Thereafter, the process fluids pass through a series of one or more test sections, shown in FIG. 1 as 18, 20, 22, and 24. Each of these test sections is constructed so as to be able to house an RCS material specimen (or specimens) to be tested and subject it (them) to differing conditions. Preferably, RCS materials of the type that are wetted by the decontamination process reagents in actual use are fastened onto a coupon/specimen holder (not shown) that is inserted into a particular DTL test section. The test sections are constructed so as to create a range of nominal fluid velocities in order to test various materials at the various velocities to which they would be subjected during actual primary system use. Thus, for example, test section 18 might be constructed with a 4" diameter flow path, test section 20 with a 6"

diameter flow path, test section 22 with a 3" diameter flow path, and test section 24 as a high speed flow section with a conical flow path tapering to a 1¼". In one preferred embodiment, wherein the recirculation pumps 10 provide a flow rate of approximately 500 gallons per minute to an empty system, or approximately 350–360 gallons per minute to a system with coupons inserted in the test sections, test sections of 6", 3", and 1¼" as just described would provide nominal fluid velocities of 5, 20, and 150 feet per second.

After passing through the various test sections, the primary flow line 12 preferably passes through one or more strainers 26, arranged in series or in parallel, to remove any coarse particulates prior to the process fluids being fed to the suction end of recirculation pump 10.

An additional dead leg test section 28 can be provided at any of several locations, as would be obvious to those of skill in the art, to allow testing of materials with a zero fluid velocity. Such a dead leg test section 28 would typically extend from the primary flow line 12 and be provided with a vent valve 30 for evacuation of unwanted gases. In FIG. 1, such a dead leg section 28 extends from primary flow line 12 between test sections 18 and 20.

Additionally, the primary loop shown in FIG. 1 is supplied with a pressurizer/accumulator 32, connected to the system via accumulator line 34. The pressurizer/accumulator 32 acts to automatically regulate the pressure and water content of the entire DTL system. The pressurizer/accumulator 32 controls a DTL venting system that automatically actuates a motor-operated valve 36 to isolate the nitrogen pressure inlet line 38 upon receipt of an overpressurization signal and thereafter actuates and opens the motor-operated vent line isolation valve 40 to reduce the DTL pressure via vent line 42 to a preset value. When the pressure requirements are satisfied, the valve alignment is automatically reversed to its original configuration.

The pressurizer/accumulator 32 also preferably incorporates a DTL level control system that provides a visual and audible alarm upon receipt of a low or high fluid level signal. When a low level alarm is received, the pressurizer/accumulator 32 automatically energizes a makeup pump 44 and opens motor-operated valve 46 to inject water into the DTL until the fluid level requirements are met. Such injection can occur at any of several points around the DTL as would be known to those of skill in the art. If a high level alarm is received in the pressurizer/accumulator 32, operator action will normally be required to blow down the DTL to a normal operating level.

The makeup pump 44 takes its suction from a demineralized water system 48 that can also preferably be used to provide water and pressure for a seal barrier system via motor-operated valve 50. Such a seal barrier system is known to those of ordinary skill in the art, and is used to protect the seals of recirculation pumps 10. The makeup pump 44 will typically have a much lower flow rate, e.g., 5 gallons per minute, than the recirculation pumps 10.

In one preferred embodiment, the pressurizer/accumulator 32 also incorporates sensors indicating when the makeup pump 44 fails to turn on or turn off such that operator action is required.

The DTL can also be provided with a drain pump 52 and drain line 54 for use when the system is to be evacuated of process fluids.

In addition, any variety of temperature, pressure, and fluid velocity instrumentation can be provided as would be known to those of ordinary skill in the art in order to monitor process conditions throughout the system.

A secondary ion exchange loop, comprised primarily of a variety of filter media, operates in parallel with the primary loop. Side flow 56 can be diverted from the primary flow line 12 at any one of a variety of points. In FIG. 1, side flow 56 is shown as being removed between test sections 22 and 24.

The secondary loop, shown in FIG. 2, is designed to support system temperature control, cleanup, and chemical injection. Side flow 56 from the primary loop enters the secondary loop via line 58. Appropriate chemicals used in the decontamination process being simulated are thereafter injected into the system in chemical injection flow 60. If desired, an in-line spectrophotometer 62 may be provided having the capability of identifying the concentration levels of the process chemicals without the need for drawing a fluid sample from the DTL for analysis. Such in-line analysis avoids any problems of chemical reaction with ambient air when a fluid sample is drawn out. In order to use such an in-line spectrophotometer 62, however, it is likely that a heat exchanger 64 must be provided upstream of the spectrophotometer 62 to cool process fluids sufficiently to avoid damaging the quartz windows used in the in-line spectrophotometer 62. Such an in-line spectrophotometer 62 would preferably channel process fluids directly to the chemical injection tank 60, whereafter the process fluids are returned to the secondary flow line 58 via a chemical injection pump 61 and flow line 63. The chemical injection pump 61 is preferably a positive displacement or diaphragm type pump capable of creating a pressure head sufficient to overcome the pressure of the secondary flow line 58.

Aside from the spectrophotometer 62, if cooling is required prior to chemical clean up, the secondary flow line 58 may be directed through a heat exchanger 66. The process fluids are thereafter directed to one or more cartridge filters 68. Normally, at least two cartridge filters 68 would be recommended along with appropriate valving (not shown) so that one can be changed while the other is in service. Such filters 68 protect the downstream resin beds from fouling and high pressure drop. The process fluids are thereafter directed to one or more flushable type demineralizers 70.

Flushable type demineralizers 70 are employed in the secondary loop for cleanup of activated corrosion products and decontamination process chemicals. Such demineralizers may preferably be constructed to allow for resin replacement in the manner described in co-pending application Ser. No. 07/621,130, entitled "Resin Processing System," incorporated herein by reference. In a preferred embodiment, the inlets, outlets, and flushing lines of the demineralizers 70 feature isolation valves (not shown) for control of demineralizer alignment These isolation valves can be controlled to open or close flow lines 72, 74, 75, 76, 78, 80, 82, 84, 86, 88, and 90 in any combination. Thus, while the demineralizers 70 depicted in FIG. 2 are primarily arranged in parallel, any arrangement of one or more demineralizers 70 may be utilized, in series or in parallel, to achieve appropriate decontamination clean up. For example, with flow lines 72, 80, 84, and 86 closed and flow lines 78, 82, 88, and 90 open, operation of two of the demineralizers 70 can be done in series.

After passing through the demineralizers 70, the fluid flow is preferably directed to one or more iron addition columns 92 wherein iron is added to the process fluids in order to more accurately simulate the dissolved iron typically present in a full size nuclear reactor system. Alternatively, a bypass line 94 can be used. While only a single iron addition column 92 is actually necessary, in a preferred embodiment, redundant addition columns along with isolation valves (not shown) are provided.

One or more post filters 96 (again along with appropriate isolation valves (not shown)) are also preferably provided downstream of the demineralizers 70 in order to remove any resin fines escaping from the demineralizers 70 along with cleaned up process fluids. Thereafter, the process fluid flow is returned to the primary loop in return flow 98.

In addition to the primary components of the ion exchange system, an ion exchange bypass line 100 can be provided and controlled via valve 102. A relief valve 104 can provide for a vent stream 106. Finally, deionized water can be provided to the system via line 108. Once again, sampling valves and additional instrumentation for monitoring temperature, pressure, and fluid velocities can be used as appropriate, and such instrumentation is known to those of ordinary skill in the art.

Flow rates in the secondary loop are typically controlled to be substantially lower than those in the primary loop. For example, with flow rates of 350-375 gallons per minute in the primary flow shown in FIG. 1, flow in the ion exchange system shown in FIG. 2 would typically be approximately 3 gallons per minute. The differential pressure around the primary loop provides the driving head for flow in the secondary loop.

In general, the entire recirculation loop is constructed from a corrosion resistent material such as stainless steel and is designed to operate at pressures and temperatures of up to 450 psi and 400° F., exceeding the maximum temperatures and pressures of the processes used.

In use, RCS materials of the type that are wetted by the decontamination process reagents in full system use are fastened onto coupon/specimen holders that are inserted into one or more of the recirculation loop test sections 18, 20, 22, 24, and 28. The DTL is then filled with demineralized water and air is vented from the DTL through vent valves, such as valve 30, located at the highest elevations in the loop. One or more of the recirculation pumps 10 is energized to initiate fluid flow in the DTL and the heater 14 is energized to elevate the fluid temperature to the required range for the chemical process being tested. Cooling water flow is initiated to the heat exchanger 16 in order to accurately control the fluid temperature. Preferably, thermocouples are located at various loop locations and are used to track and control the loop fluid temperature. Nitrogen, through use of the pressurizer/accumulator 32, is used to establish a static pressure head on the loop, thereby preventing cavitation in the recirculation pumps 10.

The ion exchange/adsorption system is used to clean and condition the process fluids during the various chemical decontamination process steps. The fluid flows from a high pressure area of the primary loop to the secondary ion exchange loop. Flow to the ion exchange loop can be reduced using valves, thereby decreasing the fluid pressure in the ion columns.

Through these processes, the DTL simulates the effects of both the decontamination procedure and clean-up sub-system on the different types of materials fastened in the coupon specimen holder. After running one or more cycles of the particular chemical decontamination process being examined, the material specimens fastened in the coupon specimen holders are removed, and are then evaluated to determine if the exposure within the DTL had any adverse effects on the materials. The DTL test sections 18, 20, 22, 24, and 28 provide a range of flow velocities in a series flow stream that simulates the RCS flow velocities.

Once particular materials have been qualified with a particular chemical decontamination process, complete system decontamination can be performed on a system using such materials. While the decontamination procedure will depend upon the particular chemical decontamination process, when such decontamination is performed in accordance with the invention described in incorporated by reference co-pending application Ser. No. 07/621,120, process fluids from the RCS are fed to the Residual Heat Removal (RHR) system by means of a pair of RHR pumps. The chemical decontamination processes occur at a temperature in the range of 150°-240° F. (65°-116° C.), as discussed above. Nevertheless, the decontamination removal system proposed to be used optimally should operate at a temperature in the range of 140° F. (60° C.).

Thus, heat removal prior to decontaminate removal is required. Heat removal will occur by steady state heat losses and, further, by cooling of the process fluids in one or more RHR heat exchangers. Since an RHR pump is typically designed for pumping on the order of 3,000 gallons (11.4 cubic meters) per minute, only one RHR pump would be required to provide the 1,000 gallons (3.79 cubic meters) per minute process flow desired within the decontamination process. A second RHR pump would be reserved as a back-up. In a typical arrangement, one RHR pump and RHR heat exchanger would be dedicated to cooling the process flow while a second RHR pump and RHR heat exchanger would remove any excess heat required to maintain a proper heat balance in the RCS.

In operation, a reactor coolant pump, or pumps, provides a source of heat, in conjunction with any decay heat from the reactor core, to establish appropriate operating temperatures for the chemical decontamination throughout the RCS, as well assisting in circulation of the coolant. In addition, operation of at least one reactor coolant pump is required for circulation, since the flow from the auxiliary RHR pumps cannot ensure uniform chemistry and temperature in the RCS as a whole.

To connect the chemical decontamination system to the RHR system, a tap-in line is connected just downstream of an RHR heat exchanger. In order to minimize penetration of the containment structure, in one embodiment the process line leading to the high head safety injection pumps is utilized for flow to the chemical decontamination system. After passing through the chemical decontamination system, wherein dissolved contaminant metals and suspended contaminant solids are removed by means of demineralizers and filters as more fully described, for example in co-pending Application Ser. No. 07/621,129, decontamination chemicals are thereafter injected as needed and process fluids are returned to the RHR system, and thereafter to the cold leg injection.

Operation of one or more reactor coolant pumps, requires a minimum RCS pressure of approximately 400 psig (29 kg/cm$^2$) to ensure proper operation of the reactor coolant pump #1 seal. During normal plant operation, the RCS pressure is controlled using a steam bubble in the primary system pressurizer. However, the use of a steam bubble during decontamination is not feasible because the steam saturation temperature at 400 psig (29 kg/cm$^2$) of 447° F. (230° C.) is too high to be used with either of the current decontamination processes, which call for temperatures in the 150°-240° F. (65°-116° C.) range. The higher temperature would not only preclude the circulation of decontamination chemicals throughout the spray lines and into the pressurizer, but would result in accelerated corrosion rates of several RCS materials of construction.

An alternative means for pressurizing the RCS during chemical decontamination is required. In one embodiment, a nitrogen gas bubble is used to maintain system pressure at, or above, the necessary pressure at the lowered temperatures required for decontamination. Nitrogen is preferable because of its inertness, general availability, low cost, and low impact if venting to the containment atmosphere were to become necessary. In addition, the quantity of nitrogen required is available on-site by installing a temporary cross-connection between the pressurizer and a safety injection system accumulator nitrogen supply line.

In order to utilize a nitrogen bubble, nitrogen is admitted to the pressurizer gas space during the RCS cool down from 350° F. (175° C.). Spray flow condenses the steam and slowly drops the pressure. The pressure drop is compensated for by the nitrogen. Alternatively, the high pressure accumulator fill line can be routed to the pressurizer.

Nitrogen pressure control permits full circulation through the pressurizer so that the spray lines, pressurizer, and surge line can be decontaminated and maintained in thermal equilibrium with the RCS loops. The nitrogen bubble will not preclude substantial decontamination of the pressurizer, since most of the activated crud will accumulate in the bottom of the pressurizer vessel. However, maximum spray flow should preferably be maintained. Thus, by using a nitrogen bubble, high pressure at the lower temperatures required for chemical decontamination is readily achieved.

Thus, the decontamination test loop qualification facility disclosed above provides a unique design for performing chemical decontamination of primary systems. A method and apparatus for assessing the feasibility of employing particular chemical decontamination processes to remove crud from primary systems without adversely affecting the integrity of the components and piping during further reactor operation has been disclosed that accurately simulates full-system decontamination procedures. Having thus described the invention, it is to be understood that the invention is not limited to the embodiments set forth herein for purposes of exemplification. It is to be limited only by the scope of the attached claims, including a full range of equivalents to which each claim thereof is entitled.

What is claimed is:

1. An apparatus for use in qualifying materials that are used in the construction of nuclear reactors for decontamination by particular chemical decontamination processes comprising:

a primary circulation loop having: (a) one or more test sections capable of holding one or more coupons of one of the materials to be tested and, due to the cross-sectional area of such test section, of establishing a fluid flow rate past such coupon or coupons that simulates a fluid flow rate used in commercial decontamination, each test section having an upstream end and a downstream end, and being arranged in series or in parallel such that the downstream end of at least one of such test sections is connected to a suction end of (b) one or more recirculation pumps whose discharge ends are connected to the upstream end of at least one of such test sections so as to create a fluid loop, and (c) a pressurizer/accumulator connected to said primary loop; and a secondary flow loop having: (a) a heat exchanger having an upstream end and a downstream end, the upstream end connected to the primary circulation loop at a point adjacent to the suction end of the recirculation pump, (b) a means for injection of chemicals into the flow system located within the secondary flow loop upstream of the heat exchanger, (c) one or more filters located within the secondary flow loop downstream of the heat exchanger, (d) one or more demineralizers located within the secondary flow loop downstream of the filter or filters, (e) one or more means for addition of iron into the flow loop located within the secondary flow loop downstream of the demineralizers, (f) one or more post-filters located within the secondary flow loop downstream of the means for addition of iron, and (g) connection means connecting said secondary flow loop downstream of the post-filters to the primary circulation loop at a second point adjacent the discharge end of the recirculation pump, such that the material coupon or coupons are subjected to conditions simulating full nuclear reactor system decontamination.

2. The apparatus of claim 1 wherein the apparatus is capable of simulating one or more of the following conditions of a full plant decontamination process: temperature, pressure, flow velocity, or chemical composition of fluid.

3. The apparatus of claim 1 wherein the primary circulation loop further includes a heat exchanger, a heater, or both.

4. The apparatus of claim 1 wherein the pressurizer/accumulator acts in conjunction with a make-up pump to regulate the fluid levels within the test apparatus.

5. The apparatus of claim 1 wherein the demineralizers can be arranged in series or in parallel in order to simulate various chemical decontamination processes.

6. The apparatus of claim 1 wherein the secondary flow loop further includes an in-line spectrophotometer capable of identifying chemical concentration levels within the test apparatus.

* * * * *